Aug. 28, 1962     E. J. KOZAK     3,051,034
MUSIC TIMING DEVICES
Filed Aug. 3, 1959
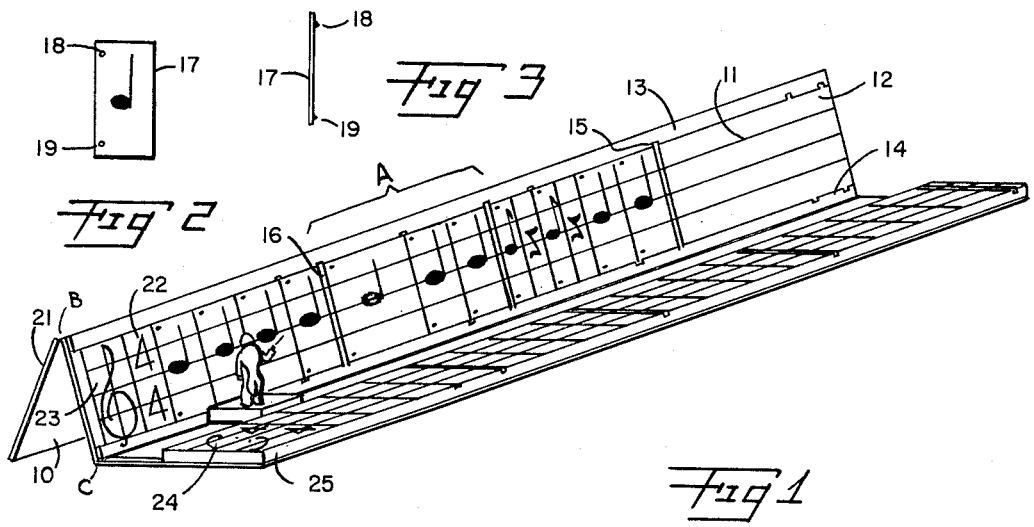
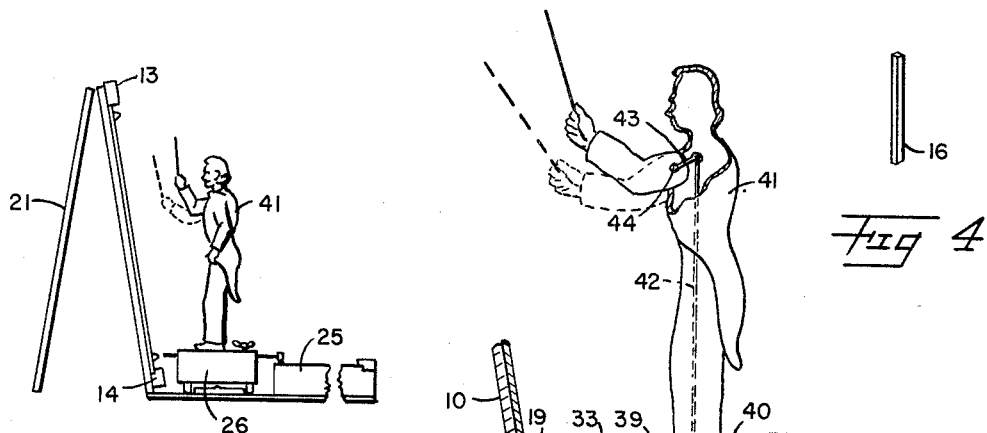
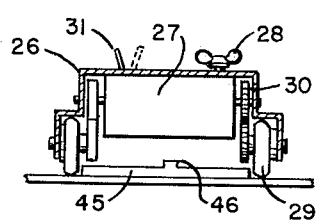
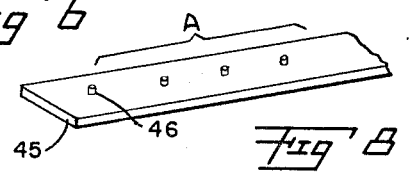
INVENTOR.
Edward J. Kozak

United States Patent Office 3,051,034
Patented Aug. 28, 1962

3,051,034
MUSIC TIMING DEVICES
Edward J. Kozak, 3729 Greenway Place, Shreveport, La.
Filed Aug. 3, 1959, Ser. No. 831,212
2 Claims. (Cl. 84—465)

The present invention pertains to musical instruments generally, but more in particular to a timing device for teaching and displaying rhythm or melodic patterns.

It is an object of the invention to provide a device which includes musical staffs with both bass and treble clefs and separately formed musical characters of notes and rests whereby a portion of a musical score may be placed upon the staffs as a visible rhythm pattern.

Another object of the invention is the provision of audible signals giving timed intervals in relationship to the values of the notes and rests used to make up the rhythm pattern so the student may more clearly appreciate the values of the notes and rests. These signals are produced by a spring operated mechanism moved between the bass and treble clefs and includes a signal arm projecting therefrom which strikes a projection on each note and in turn strikes a gong. Hence, as the mechanism moves with uniform speed along the score, a student is familiarized with the time interval between the notes and rests.

Still another object of the invention is the provision of separately formed notes and rests which are proportioned to the length of the measure. For instance, if the total length of the measure is one foot, a half note would be six inches; a quarter note three inches; an eighth note one and one-half inches, etc. Thus a student could not set up a wrong rhythm pattern in a given length measure, since the total number of notes and rests would not fit in the given space allotted to the measure length.

A still further object of the invention is the provision of a mechanical conductor who rides upon the mechanism moving between the bass and treble clefs. The directing arm of the conductor is mechanically associated with still another timing strip positioned beneath the traveling car on which he rides so that as the car moves along the tracks between the clefs, the arm moves up and down rhythmically and to perfect synchronization with the time signature previously chosen by the student for his rhythm pattern and with the notation displayed.

In short, the present invention provides a rhythm timing device constructed in the form of an interesting game whereby the music student may set up his own rhythm pattern with both visible and audible signals.

Other objects and advantages of the invention will become apparent in the course of the following detailed description when viewed together with the accompanying drawing in which:

FIG. 1 is an isometric view of the rhythm instructing device made in accordance with the teachings of the present invention.

FIG. 2 is a front view of one of the musical characters used with the device.

FIG. 3 is a side view of FIG. 2.

FIG. 4 is a view of a measure bar used to establish the length of a measure upon the staffs.

FIG. 5 is a broken end view of the invention.

FIG. 6 is an enlarged detailed sectional view illustrating more in detail the mechanism by which the signals are produced.

FIG. 7 is an elevational view of the spring operated car with parts broken away to more clearly illustrate the means for moving the car.

FIG. 8 is a broken isometric view of the timing strip used to give the principal rhythm pattern to the conductor's arm.

In the drawing, numeral 10 designates a backboard which carries upon its face the lines 11 and spaces 12 of a musical staff. Along the top and bottom of the backboard are molding strips 13 and 14. Spaced at the proper intervals along these strips are notches 15 which are adapted to receive the measure bar 16 illustrated in FIG. 4. Thus, to set up a length of a measure for four-quarter time, the student simply procures his set of measure bars and snaps them into the proper notches in the moldings 13 and 14 and the lengths of his measures are automatically set.

Reference is now made to the musical characters, the time signatures and clef signs together with the method of attaching them to the backboard 10. All of the musical characters are made of a transparent, plastic material with the character painted or otherwise affixed to the face thereof so that when they are arranged upon the board 10 the lines 11 and spaces 12 will show through and thus simulate a musical staff. A description of FIGS. 2 and 3 will more or less describe all of the musical characters used in the device. In FIG. 2 a quarter note is shown placed upon a plastic background 17. At the top left and bottom left of the backing strip are projections 18 and 19 projecting outwardly from the face of the back 17 in the manner illustrated in FIG. 3. These projections are provided only on the notes and in the same relative positions. Their purpose will be described later in the specification.

It will be remembered that the horizontal width of the backing strip 17 has a definite relationship with the value of the musical character imposed upon its face and with the length of the measure. For instance, in our quarter note illustrated in FIG. 2, only four of the same could be placed within the space on the drawing marked "A"; if such had been previously set up by a series of measure bars for 4/4 time. Thus whether four quarter notes were used or whether any other note or rest values were used, only a total number could be placed with a given measure length whose combined values equaled the value given by the time signature. The same would be true if the measure bar is set for 3/4 or 6/8 time. In short, for any given time signature of the measure bars according to a chosen time signature, the student cannot fill the measure space with any more or less characters than will exactly fill the space.

Reference to FIG. 6 will more clearly illustrate the method of affixing the various characters to the backboard 10. It will be noted that the bottom molding strip 14 is provided with a slot 20 running the entire length of the same, the offset being substantially the thickness of the character strips. With the strips positioned in the slots as illustrated and with the backboard 10 leaning against a foldable backrest 21 the treble clef arrangement is firmly supported and may be leaned to various angles to suit the student. The time signature strip 22 and the treble clef sign 23 are both made of plastic material similar to the musical characters and are mounted to the backboard in the same manner.

What has been said of the treble clef is also true of the bass clef. The musical character construction, the measure bars and the method of mounting are identical. The bass clef sign 24 is, of course, different; and the entire bass clef is placed upon a raised platform 25.

Reference is now made to FIG. 7 of the drawing which illustrates an end view of a car 26 arranged to move along between the treble and bass clefs. The car includes an enclosed spring unit 27 which may be wound by the handle 28. This spring unit 27 drives a set of wheels 29 by means of a gear train 30. Numeral 31 designates a speed control lever by means of which the speed of movement of the car may be controlled. It is to be understood that the means of locomotion of the car forms no part of the present invention, since the former art is fully supplied with movements of toys and the like which could be readily adapted for the present use. What is part of the invention, however, is the arrangement of the components illustrated in FIG. 6 used to produce both visual and audible signals of note values as the car moves between the bass and treble clefs.

Arranged above the left wheel in the FIG. 6 is a pin 32 journaled for movement through the frame of the car 26. The pin is normally urged against the face of the note arrangement on the treble clef by means of a spring 33. The inner end of the pin is in alignment with a bell 34. Now it can be seen that as the car moves along the length of the device, the pin 32 will successively strike the projections 19 on each of the notes assembled on the upper staff and thus permit a listener to judge the time intervals between the soundings of the bell.

On the right side of the device as illustrated in FIG. 6 is an audible signalling arrangement used in connection with the bass clef. This consists in a lever 35 made in the configuration shown in the drawing and hinged to the frame of the car 26. The outer end of the lever projects outwardly from the car and over the raised platform 25 of the bass clef and is provided with a wheel 36 which normally rolls along the top faces of the note arrangement as assembled on the bass clef. The inner end of the lever is provided with a clapper 37 positioned in alignment with another bell 38 of different pitch. As the car 26 moves along its directed route, the wheel 36 will strike the projections 18 on the upper ends of the notes and thus a listener will be able to audibly determine the value of the time interval between the soundings of the bell 38. It will be noted that the projections on the notes are in vertical alignment, but are placed at the left side of the note. This is to produce the signal as soon as the car approaches the note. Also provided on both the signal arrangements described above are stop levers 39 and 40 so that either or both signals from the bass and treble clefs may be stopped at will, allowing the student to study the rhythm pattern more closely.

The visual signal is performed by an animated conductor designated generally on the drawing by the numeral 41. The conductor is formed of sheet metal and is affixed to the car 26 in a position to face the treble clef and with his back to the student. Extending upwardly through the conductor 41 and the car 26 is a push rod 42, the upper end of which is affixed to the end of a lever 43. The other end of the lever is attached to a hinge pin 44 by which the conductor's arm is made to move. Within the car and associated with the push rod 42 is a spring 44a normally urging the rod downwardly; hence holding the conductor's arm in the "Up" position.

Reference is now made to FIG. 8 which illustrates the general timing strip 45. Along the top face of the strip are raised projections 46. This strip 45 is arranged to be positioned between the upper and lower clefs and along the floor of the device. The raised projections 46 are spaced at intervals corresponding to the time signatures chosen for the rhythm pattern and when in position on the device, are the means of operating the push rod 42 and consequently, the director's arm. There are several strips with the device, each provided with raised projections corresponding to various time signatures. Thus, when one strip is installed on the device, the conductor will move his arm up and down as shown by the dotted lines on the drawing and in the time of the general rhythm pattern. The movement is, of course, produced by the movement of the car 26 along the track as formerly described. The projections 46 on the general timing strip 45 are such as to start at the first beat of the measure and to be congruent with the number of beats in the measure as set forth by the time signature and measure bar as formerly described for setting up a measure.

It will be noted also, especially in FIGS. 6 and 7 that the sides of the timing strip 45 serve as guides to the wheels 29 of the car 26 so that the car may move smoothly and with the least amount of side sway along its appointed track.

A résumé of the functions and use of the device will now follow. Let it be supposed that a student of percussion instruments is using the device to study a rhythm pattern. He chooses to select a problem in four-quarter time and sets up his problem accordingly. First, he will pick his general 4/4 strip for general timing and place it on the floor of the device between the base and treble clefs. Next he will put his treble clef sign 23 and bass clef sign 24 in their proper positions. Following this, he will set the time signature strips 22 for 4/4 time in both the bass and treble clefs. Next he will place measure bars 16 in their proper notches 15 along the length of the simulated staffs. He is now ready to choose a selection of notes and rests. Let us suppose that he has no definite rhythm in mind, but elects to place notes and rests at random on the two staffs just to see what pattern will result. It will be remembered that whatever combination of notes he selects, only that combination will fit between the measure bars whose total combined values are equivalent to 4/4 time. Having placed the notes and rests in the proper receiving slots 20 on the bottom molding, the student winds the animated conductor and places him at the beginning of the score for his conducting. When he releases the speed lever 31 on the car 26, the conductor moves to the right and nears the first downbeat. As the push rod 42 strikes its first projection 46 on the general timing strip 45, the conductor gives the downbeat for the beginning of the pattern and carries this general pattern throughout all the measures.

As the car passes the notes and rests now assembled on both the upper and lower staffs, the audible signals are given. The projections on the car as formerly described will strike the projection on each note as it reaches it in each clef, skipping the rests that might be interspersed therebetween. The student is thus given, in syncopated sound, the timing intervals between the musical notes he has selected for a rhythm pattern.

At the will of the student, he may utilize the stop levers 39 or 40 to block out the signal from either or both the treble and bass clefs so that either of the rhythm patterns might be studied more closely in relation to the general pattern as given by the conductor.

The invention is simple in its construction. It is arranged to be folded at points B and C so that all of the components may be conveniently placed in a container and made easily portable. While it is preferred that the device be constructed for approximately four measures of the common time signatures, it could be made slightly more complicated to include any or all of the time signatures used in musical composition and for any desired number of measures.

The above description of the invention has been made by way of example only. It is to be understood that the kinds of materials, dimensions and other changes in actual construction could be made without departing from the spirit and scope of the invention as defined by the following claims.

I claim:

1. A music timing device comprising, a pair of musical staffs similating the bass and treble clefs of a musical score, musical characters in the form of notes and rests adapted for positioning upon said staffs in proper musical relationship, movable measure bars, means for positioning said bars between said notes and said rests to divide the same according to a chosen time signature, an animated conductor positioned between said bass and said treble clefs, means for moving said conductor along between said clefs, means cooperating with said conductor whereby the same is made to move an arm up and down in conducting fashion in the rhythm of the chosen time signature and means also associated with said conductor for producing an audible signal upon approaching a note character in either the bass or treble clef.

2. In a music timing device, a pair of staffs similating the bass and treble clefs of a musical score, musical characters in the form of notes and rests adapted for positioning upon said staffs, measure bars adapted to be placed upon said staffs according to a selected time signature, means permitting only the proper total number of notes and rests between said measure bars as called for by the time signature, an animated conductor adapted for positioning between said bass and said treble clefs, means for moving said conductor between said clefs as said notes and rests are read as a musical score, means for moving an arm of said conductor up and down in conducting fashion and in rhythmic timing according to the chosen signature, means on the note characters cooperating with said conductor for sounding an audible signal upon approach of said conductor to said note in either the bass or treble clef and means for blocking out either of said signals.

References Cited in the file of this patent
UNITED STATES PATENTS

| | | |
|---|---|---|
| 740,137 | Humpidge | Sept. 29, 1903 |
| 1,319,919 | Barker | Oct. 28, 1919 |
| 1,657,137 | Scovill | Jan. 24, 1928 |
| 2,100,857 | Lang | Nov. 30, 1937 |
| 2,619,868 | Moore et al. | Dec. 2, 1952 |